(12) United States Patent
Li

(10) Patent No.: US 11,660,907 B2
(45) Date of Patent: May 30, 2023

(54) STONE COMPOSITE BOARD AND PROCESSING METHOD

(71) Applicant: Guizhou Estondard Co., Ltd, Guizhou (CN)

(72) Inventor: Zuoxiang Li, Guizhou (CN)

(73) Assignee: GUIZHOU ESTONDARD CO., LTD, Guizhou (CN)

( * ) Notice: Subject to any disclaimer, the term of this patent is extended or adjusted under 35 U.S.C. 154(b) by 510 days.

(21) Appl. No.: 16/827,608

(22) Filed: Mar. 23, 2020

(65) Prior Publication Data

US 2021/0260915 A1 Aug. 26, 2021

(30) Foreign Application Priority Data

Feb. 26, 2020 (CN) .......................... 202010121898.3

(51) Int. Cl.
| | | |
|---|---|---|
| B44C 5/00 | (2006.01) |
| B24B 7/00 | (2006.01) |
| B28D 1/00 | (2006.01) |
| B32B 1/00 | (2006.01) |
| B32B 7/00 | (2019.01) |
| B32B 9/00 | (2006.01) |
| B32B 37/00 | (2006.01) |
| B32B 38/00 | (2006.01) |
| B44C 5/04 | (2006.01) |
| B24B 7/19 | (2006.01) |
| B28D 1/08 | (2006.01) |

(Continued)

(52) U.S. Cl.
CPC ............. *B44C 5/0438* (2013.01); *B24B 7/19* (2013.01); *B28D 1/086* (2013.01); *B28D 1/20* (2013.01); *B32B 1/00* (2013.01); *B32B 7/12* (2013.01); *B32B 9/002* (2013.01); *B32B 37/1207* (2013.01); *B32B 38/0012* (2013.01); *B32B 2037/1215* (2013.01); *B32B 2309/02* (2013.01); *B32B 2309/04* (2013.01); *B32B 2309/12* (2013.01); *B32B 2419/00* (2013.01); *B32B 2451/00* (2013.01); *B32B 2607/02* (2013.01)

(58) Field of Classification Search
CPC .. B44C 5/00; B44C 5/04; B44C 5/043; B44C 5/0438; B24B 7/00; B24B 7/10; B24B 7/19; B28D 1/00; B28D 1/08; B28D 1/086; B28D 1/20; B32B 1/00; B32B 7/00; B32B 7/10; B32B 7/12; B32B 9/00; B32B 9/002; B32B 37/00; B32B 37/10; B32B 37/12; B32B 37/12; B32B 37/1207; B32B 38/00; B32B 38/001; B32B 38/0012
See application file for complete search history.

(56) References Cited

U.S. PATENT DOCUMENTS

| | | | | |
|---|---|---|---|---|
| 6,149,506 A | * | 11/2000 | Duescher | ............... B24B 1/00 |
| | | | | 451/36 |
| 6,413,618 B1 | * | 7/2002 | Parker | ............... B44C 5/0438 |
| | | | | 428/49 |
| 2018/0326695 A1 | * | 11/2018 | Kroll | ............... B41F 9/025 |

* cited by examiner

*Primary Examiner* — Jacob T Minskey
*Assistant Examiner* — Matthew Hoover
(74) *Attorney, Agent, or Firm* — Hamre, Schumann, Mueller & Larson, P.C.

(57) ABSTRACT

According to a processing method of a stone composite board, the two sides of a natural stone board are ground and flattened until a preset standard value of thickness variation is reached, then the surface planes and base material layers are subjected to pressure-compositing through adhesive layers, afterwards splitting is conducted, and the natural stone layer is subjected to calibrated planing with diamond roller and surface treatment to obtain the ultra-thin stone composite board.

17 Claims, 5 Drawing Sheets

(51) Int. Cl.
*B28D 1/20* (2006.01)
*B32B 7/12* (2006.01)
*B32B 37/12* (2006.01)

STONE COMPOSITE BOARD AND PROCESSING METHOD

FIELD

The present application relates to the technical field of architectural decoration, in particular to a stone composite board and a processing method thereof.

BACKGROUND

At present, during architectural decoration construction, plate-shaped stone composite boards are often used for wrapping and applying decorative construction of curved wall surfaces or column surfaces. In the prior art, stone composite boards are often formed by compositely connecting base layers with stones through adhesive layers and are large in thickness and poor in bending performance and aesthetic performance. For example, a manufacturing method of an ultra-thin flexible stone composite board in the prior art comprises the following steps including step 1, raw material pre-treatment: the surfaces of natural stones are flattened, then the natural stones are dried, and the surfaces of flexible substrates are cleaned; step 2, gluing treatment: an adhesive is applied to the surfaces of the natural stones and the flexible substrates, and the natural stones and the flexible substrates are bonded together to form a stone composite board; step 3, curing treatment: the stone composite board is subjected to pressurization curing for 48 hours; step 4, sizing treatment: the surface of the stone composite board subjected to pressurization curing is subjected to fixed length, width and thickness treatment; step 5, polishing treatment: the surface of the stone composite board is subjected to fine grinding and polishing; step 6, bending treatment: the stone composite board is subjected to bending according to the required radius; and step 7, surface coating treatment: smooth resin is applied to the surface of the stone composite board for sealing the cracked surfaces of the natural stones to form a dense and bright sealer. The stone composite board produced through the method is relatively large in thickness and poor in bending performance and aesthetic performance. When ultra-thin stones are produced, the reject rate is significantly increased when the thickness is reduced, and stone cracking and degumming occur in the production process. During usage, due to degumming, peeling, leaking and other conditions, the product service life is short.

SUMMARY

The present application provides a stone composite board and a processing method, and aims to solve the problems such as stone composite boards being large in thickness and poor in bending performance and aesthetic performance in the prior art.

On the one hand, the present application provides a processing method of a stone composite board, and the method comprises the following steps:

grinding and flattening the two sides of a natural stone board until a preset standard value of thickness variation is reached;

carrying out pressure-compositing on the ground flattened natural stone board and a base material layer through an adhesive layer;

carrying out calibrated planing with diamond roller on the natural stone layer; and carrying out surface treatment on the natural stone layer.

Another embodiment of the present application further provides a processing method of a stone composite board, and the method comprises the following steps:

grinding and flattening the two sides of a natural stone board until a preset standard value of thickness variation is reached;

carrying out pressure-compositing on two surface planes of the ground flattened natural stone board and base material layers through adhesive layers;

splitting the natural stone board with the two surface planes being bonded with the base material layers;

carrying out calibrated planing with diamond roller on a natural stone layer; and carrying out surface treatment on the natural stone layer.

In the above solution, preferably, the standard value of said thickness variation is ±δ, wherein δ is not greater than $\frac{1}{10}$ of the thickness of the natural stone layer of a final product;

preferably, the pressure during pressure-compositing is higher than 30 tons.

Preferably, in the step of said pressure-compositing, at least one surface plane of the natural stone board is coated with the adhesive, then covered with a base material layer correspondingly, and afterwards the natural stone board and the base material layer(s) are subjected to cold-pressing compositing for bonding together. Alternatively, at least one surface plane of the natural stone board is covered with the solid hot-melt adhesive, then covered with a base material layer correspondingly, and afterwards the natural stone board and the base material layer(s) are subjected to hot-pressing compositing for bonding together.

Preferably, the temperature of said hot-pressing compositing is increased to be not lower than 260 degrees Celsius; and further, hot-pressing compositing is maintained at a high temperature for 20 to 30 minutes under the pressure condition.

Further preferably, during said hot-pressing compositing, the temperature is cooled to room temperature while the pressure is maintained. Further, the low temperature is maintained for 20 to 30 minutes under the pressure condition.

Preferably, a band saw with diamond cutter blades on the edge is used for transversely splitting the natural stone layer with the top surface and the bottom surfaces being bonded with the base material layers.

Further preferably, the two ends of the band saw are connected with rotation shafts correspondingly, by applying force to the rotation shafts, the tension of the band saw is maintained to achieve tension compensation. Optimally, the splitting saw kerf is less than 3 mm, and the splitting width is 1.2-2 m.

Preferably, in the step of said planing with diamond roller, the natural stone layer is roller-planed to a preset thickness by a roller with an emery surface. Further preferably, in the step of planing, the width of the roller is not less than the width of the stone layer.

Preferably, in the step of said surface treatment, the surface of the natural stone layer is ground and polished through a grinding head (or subjected to matt finishing), or a leather surface is formed through a wire brush, or a lychee surface is formed by applying spotting force.

In any one of the embodiments of the present application, preferably, the thickness of the natural stone board is 1.1-1.2 cm.

In any one of the embodiments of the present application, preferably, the thickness of the natural stone layer of a stone composite board output after said surface treatment is 0.5-2.5 mm.

In any one of the embodiments of the present application, preferably, the thickness of the stone composite board output after said surface treatment is 1-3 mm.

In any one of the embodiments of the present application, preferably, the thickness of the natural stone layer of the stone composite board after said surface treatment is 0.1-1 mm.

In any one of the embodiments of the present application, preferably, the thickness of the natural stone layer of the stone composite board after said surface treatment is less than or equal to 0.8 mm or is less than or equal to 0.6 mm or is less than or equal to 0.4 mm or is less than or equal to 0.2 mm or is 0.2-0.4 mm or is 0.4-0.6 mm or is 0.6-0.8 mm.

On the other hand, the present application provides a stone composite board which is obtained by the processing method according to any one of the embodiments of the present application, the stone composite board comprises a base material layer, an adhesive layer and a natural stone layer, the surface of the base material layer is connected with the natural stone layer through the adhesive layer, and the thickness of the natural stone layer is less than or equal to 0.8 mm or is less than 1 mm or is 0.5-2.5 mm.

In the above solution, preferably, the base material layer is a flexible material or a rigid material. The flexible material is metal, alloy, polymer materials or fiber materials; and the rigid material is tiles, composite wood, polymer materials, glass or other materials.

Preferably, the embodiments of the present application further comprises a step of bending the stone composite board; the stone composite board comprises at least one outwards-curved structure whose circle center is located outside of the base material layer side; or the stone composite board comprises at least one inwards-curved structure whose circle center is located outside of the natural stone layer side; or the stone composite board comprises at least one outwards-curved structure and at least one inwards-curved structure.

Further preferably, the thickness of the natural stone layer is less than or equal to 0.2 mm, the curvature radius of the outwards-curved structure is no less than 5 cm, and the curvature radius of the inwards-curved structure is no less than 50 cm; or the thickness of the natural stone layer is 0.2-0.4 mm, the curvature radius of the outwards-curved structure is no less than 50 cm, and the curvature radius of the inwards-curved structure is no less than 100 cm; or the thickness of the natural stone layer is 0.4-0.6 mm, the curvature radius of the outwards-curved structure is no less than 50 cm, and the curvature radius of the inwards-curved structure is no less than 400 cm.

At least one embodiment of the present application can achieve the following beneficial effects.

Through the stone composite board processing method and the ultra-thin stone composite board manufactured by the processing method, the problems of large thickness, low yield and short service life of stone composite boards in the prior art can be solved.

The stone composite board is uniform in thickness, good in flatness and wide in available sizes; the composite structure is dense and firm, and is not liable to fall off, and the service life is prolonged; and processing and cutting operations are facilitated, the yield is increased, and the construction effect and efficiency are improved.

The thickness of the stone composite board can be reduced, the bending performance is improved, the applying decoration requirements of the circular arc-shaped convex surfaces of columns or curved wall surfaces can be met, and meanwhile the decorative aesthetic performance is maintained.

BRIEF DESCRIPTION OF THE DRAWINGS

The drawings described here are used to provide a further understanding of the present application and constitute a part of the present application. The schematic embodiments of the present application and the description thereof are used to explain the present application, and do not improperly limit the present application. Wherein.

In the figures: 1—Base material layer, 2—Adhesive layer, 3—Natural stone layer, 31—Natural stone board, 32—flat surface, 4—Calibrated grinding head, and 5—roller for calibrated planing with diamond roller. In the figures, f denotes pressure during pressure-compositing, t denotes thickness of a stone composite board, w denotes width of a stone composite board, s denotes width of a saw kerf, to denotes thickness of a natural stone board, $t_1'$ denotes thickness of a splitted natural stone layer, $t_1''$ denotes thickness of a natural stone layer subjected to emery roller planing, $t_1$ denotes thickness of the natural stone layer subjected to surface treatment, $t_2$ denotes thickness of a base material layer, $r_1$ denotes curvature radius of an outwards-curved structure of a stone composite board, and $r_2$ denotes curvature radius of an inwards-curved structure of a stone composite board.

DETAILED DESCRIPTION OF THE EMBODIMENTS

In order to make the purpose, technical solutions and advantages of the present application more clear, the technical solutions of the present application will be described in conjunction with embodiments of the present application and corresponding drawings. Obviously, the described embodiments are only a part of the embodiments of the present application, but not all the embodiments. Based on the embodiments in the present application, all other embodiments obtained by those of ordinary skill in the art without creative efforts shall fall within the protection scope of the present application.

The technical solutions provided by the embodiments of the present application will be described in detail below in conjunction with the drawings.

Figure 1:
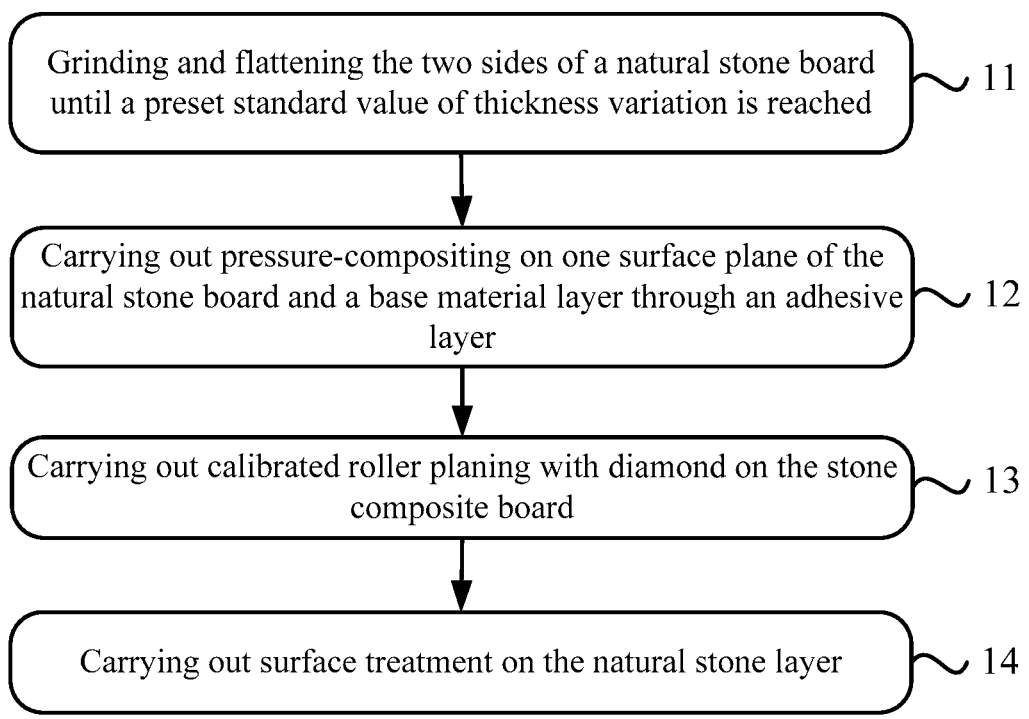
FIG. 1 is a flowchart of an embodiment of a processing method of a stone composite board of the present application.

A processing method of a stone composite board, as shown in FIG. 1, comprises the steps 11 to 14 as follows.

Figure 3:
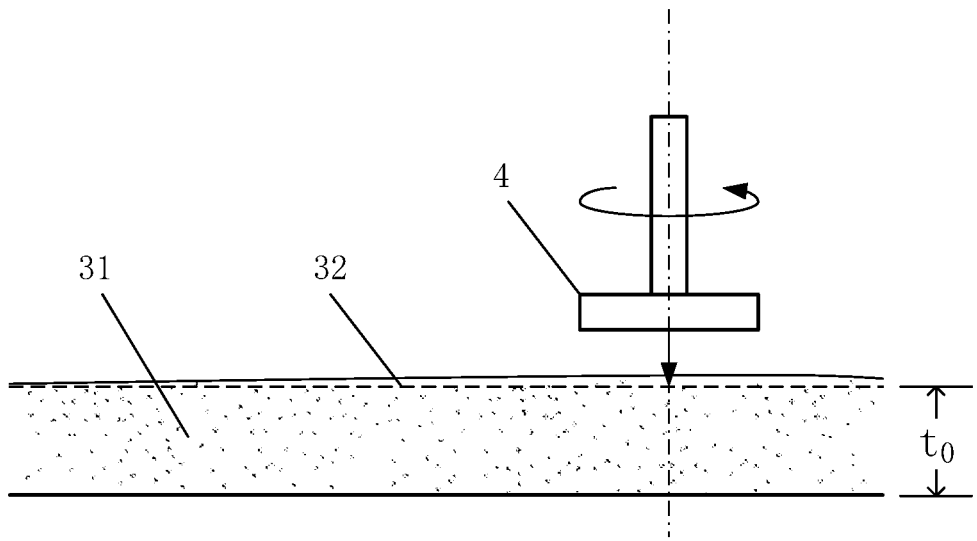
FIG. 3 is a schematic diagram of calibrated grinding according to a method of the present application.

Step 11, referring to FIG. 3, the two sides of a natural stone board 31 are ground and flattened until a preset standard value of thickness variation is reached; and in the step of flattening the stone board, thickness variation control is creatively implemented in the present application. Thickness variation refers to the thickness difference between different positions of the stone board. In order to make the board thickness uniform, the surfaces of the stone board are ground to form standard planes.

In order to meet the requirement, a grinding mode different from traditional processes is adopted by the present application. Traditional grinding modes, such as a mode adopting pneumatic grinding tools just for achieving local flattening floats within a wide range fluctuating along with the surfaces of stones. Calibrated grinding is adopted in the grinding step of the present application which refers to grinding with a preset size. For example, a servo motor in lead screw drive is used for precisely controlling the position of an grinding head 4, so that the surface of the natural stone board 31 is forcibly ground to a preset thickness to; or the maximum position at which a working surface of an grinding head moves in the direction perpendicular to the stone surface is defined by the position limiter, until the stone surface is ground to a calibrated flat surface 32.

Preferably, the standard value of thickness variation is ±δ, wherein δ is not greater than 1/10 of the thickness of the natural stone layer of the final product. For example, if the thickness of the natural stone layer of the product is 2-3 mm, the thickness variation range of the natural stone board is less than ±0.2 mm. In the double-sided flattening step in the present application, the thickness variation is controlled, the uniformity of stones is improved, the stones can be prevented from cracking under the pressure-compositing condition, and the effect that a product produced through steps 13 and 14 has a thinner natural stone layer (for example, the thickness is less than 1 mm) becomes possible; and for the product with a smaller thickness variation, the service life can be improved, and the situation that the adhesives unevenly permeate to the stone surfaces and hence affect the appearance is avoided.

Figure 4:
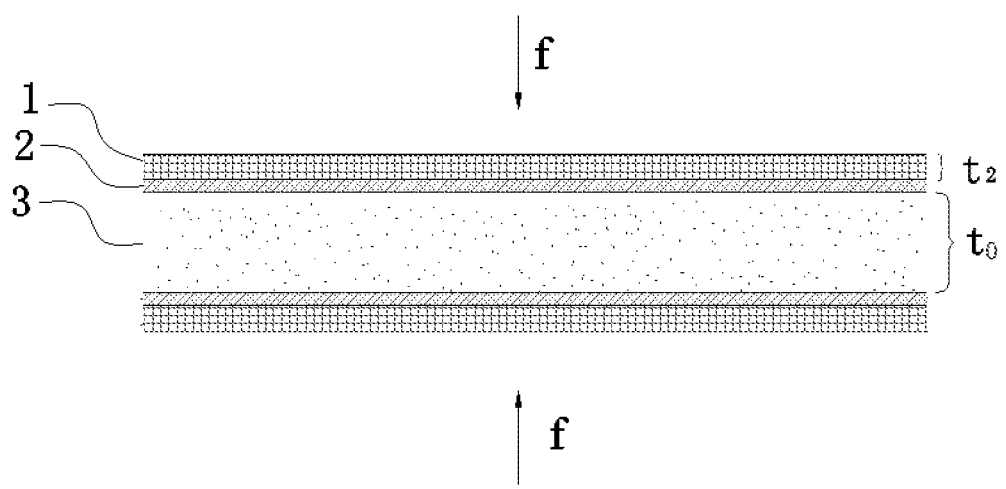
FIG. 4 is a schematic diagram of pressure-compositing according to a method of the present application.

Step 12, referring to FIG. 4, pressure-compositing is carried out on one surface plane of the ground flattened natural stone board 31 and a base material layer 1 through an adhesive layer 2, wherein the arrow indicates the pressure direction; and the pressure-compositing mode can be cold-pressing compositing or hot-pressing compositing.

During cold-pressing compositing, for pressure-compositing, one surface plane of the natural stone board is coated with an adhesive, then a base material layer covers the adhesive, and afterwards the natural stone board and the base material layer are bonded at room temperature under the pressure condition; and the adhesive may include epoxy resin.

During hot-pressing compositing, for pressure-compositing, one surface plane of the natural stone board is covered with a solid hot-melt adhesive, then the solid hot-melt adhesive is covered with a base material layer, and afterwards the natural stone board and the base material layer are bonded under the heating and pressure conditions; and the hot-melt adhesive is solid glue which melts after being heated.

Preferably, the pressure f during pressure-compositing is greater than 30 tons. The pressure is uniformly applied. The pressure holding time is 20 minutes to 4 hours, and the maximum width of the natural stone board or the stone composite board can be 2 m.

Through the pressure-compositing technique in the present application, the product aging-resistant is high, and the product service life is prolonged. Particularly, a better effect can be achieved during hot-pressing compositing in order to prevent a product from aging and peeling.

Figure 7:
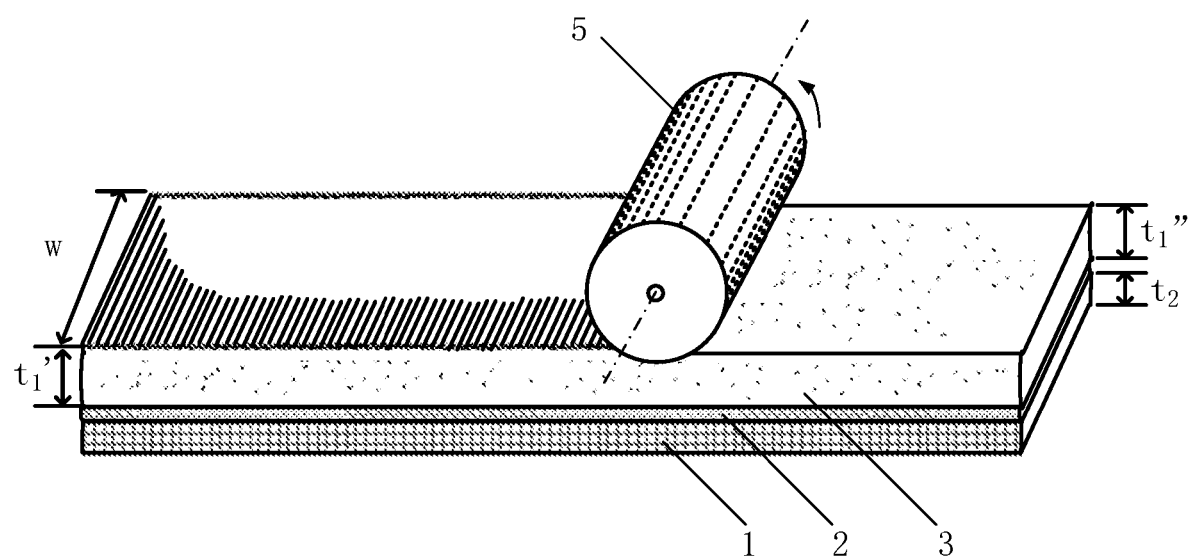
FIG. 7 is a schematic diagram of calibrated planing with diamond roller according to a method of the present application.

Step 13, referring to FIG. 7, calibrated planing with diamond roller is carried out on the natural stone board; and a technical means of diamond roller planing is created in the present application. In the step of planing with diamond roller, the surface of the natural stone layer 3 is cut to a preset thickness by means of a roller 5 with an emery surface. The roller is cylindrical, and the surface of the roller is plated with emery. During production, the composite board is fixed horizontally with the base material layer facing down. The roller is axially parallel to the surface of the natural stone layer. When the roller rotates, the emery surface makes contact with the surface of the stone layer for achieving cutting. In order to counteract the tangential force generated by the roller on the surface of the stone layer, sufficient friction force is applied to the lower surface of the base material layer and the surface of a planer, so that the composite board is prevented from sliding. Preferably, the height of the surface of the roller is precisely controlled by a servo motor, and the natural stone layer is cut to a calibrated thickness.

In order to achieve uniform roller planing, the width of the roller is preferably not less than the width w of the stone layer.

It should be noted that the preset thickness can be reached by roller planing once, and the desired thickness value is reached, or the thickness can be preset in stages, and the desired thickness can be finally reached by multiple planing.

It should also be noted that the thickness is preset to be not less than the thickness value $t_1$ of the natural stone layer of the product, and the thickness variation range is maintained to be ±t1/10 after roller planing.

Through rigid calibrated roller planing carried out on the stone composite board, that is, the surface of the natural stone board is planed by the roller 4 through rigid pressure, so that the thickness of the natural stone board can meet the requirement, and meanwhile, the thickness uniformity and surface flatness can be improved. However, in the grinding process in the prior art, the position of the grinding disc is affected by the inclination degree of the surface of the natural stone board, consequently, the thickness uniformity and surface flatness of the ground natural stone board are deficient.

Step 14, surface treatment is carried out on the natural stone layer.

The surface of the natural stone layer 3 of the stone composite board subjected to rigid calibrated roller planing is ground and polished (or subjected to matt finishing), or a leather surface is formed through a wire brush, or a lychee surface is formed by applying spotting force to a grinding head.

A grinding head with abrasive surface from No. 0 to No. 3000 can be used for grinding and polishing the surface of the natural stone layer, for example, a No. 500 abrasive surface can be used for surface polishing. The thickness of the stone composite board can be reduced by, for example, 0.5 mm through surface polishing.

During surface polishing treatment, as in step 11, the technique of calibrated grinding, as mentioned above, is adopted for precisely controlling the surface grinding process, for example, the maximum position at which a working surface of a grinding head moves in the direction perpendicular to the stone surface is limited, until the stone surface is ground to a calibrated flat surface.

Through planing with diamond roller adopted in the embodiment of the present application, the thickness of the natural stone layer of the ultra-thin stone composite board can be 3 mm or below. After further surface processing, the natural stone layer with the thickness range of 0.1-3 mm can form products of a variety of specifications.

The planing with diamond roller renders the stone layer uniform, the product surface strength consistent, post-processing convenient, the precision high, bending easy, and damage small.

Figure 2:
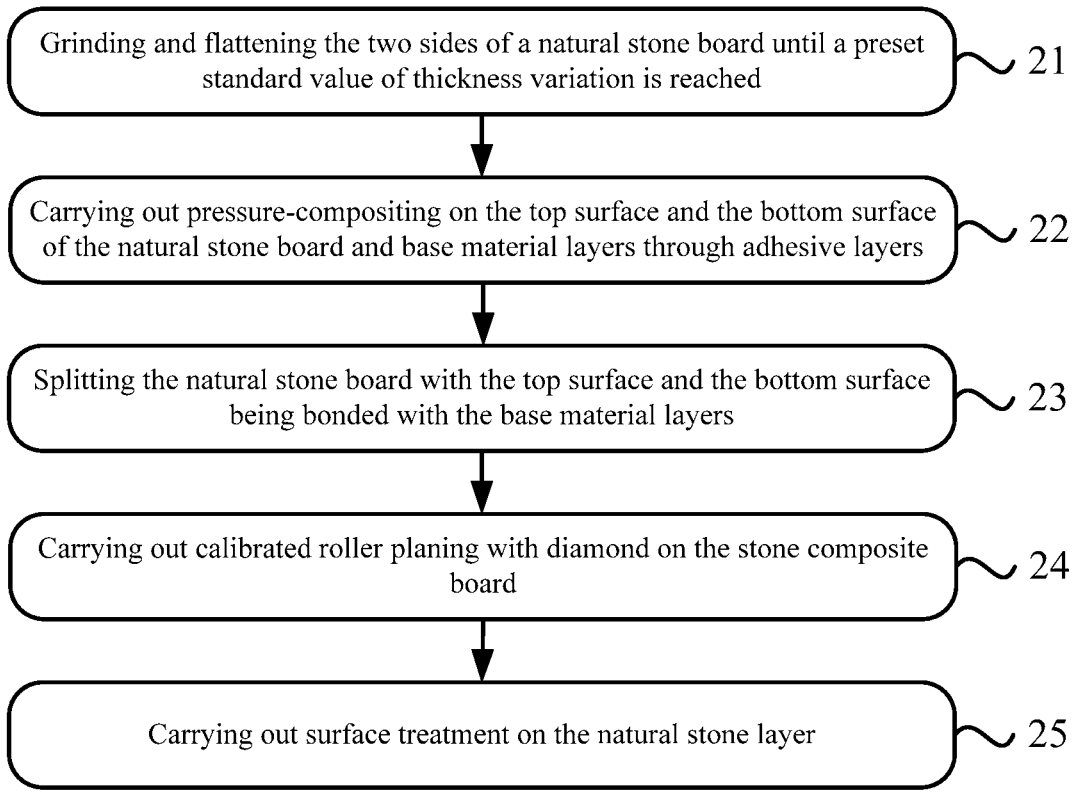
FIG. 2 is a flowchart of another embodiment of a processing method of a stone composite board of the present application.

In another embodiment of the present application, as shown in FIG. 2, a processing method of a stone composite board is provided, which comprises steps 21 to 25 as follows.

Step 21: the two sides of a natural stone board are ground and flattened until a preset standard value of thickness variation (same as step 11) is reached;

Step 22: pressure-compositing is carried out on two surface planes of the ground flattened natural stone board and base material layers through adhesive layers;

The top surface and the bottom surface of the natural stone board are coated with adhesives, then covered with base material layers correspondingly, and afterwards the natural stone board and the base material layers are subjected to cold-pressing compositing; or the top surface and the bottom surface of the natural stone board are covered with solid hot-melt adhesives, then covered with base material layers correspondingly, and afterwards the natural stone board and the base material layers are subjected to hot-pressing compositing.

The pressure is uniformly applied. Preferably, the pressure f during pressure-compositing is greater than 30 tons. The maximum width of the natural stone board or the stone composite board can be 2 m.

Figure 5:
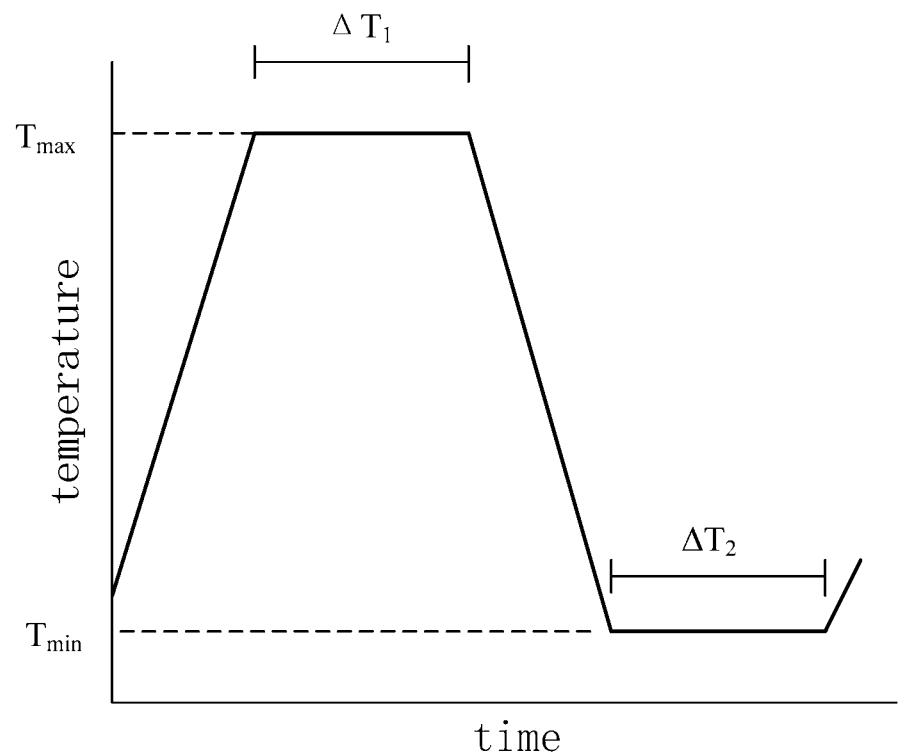
FIG. 5 is a schematic diagram of a temperature cycle of hot-pressing compositing.

As shown in FIG. 5 indicating the temperature cycle of hot-pressing compositing, preferably, during the hot-pressing compositing process, the high temperature $T_{max}$ is not lower than 260 degrees Celsius, and is maintained under a constant pressure condition of no less than 30 tons for a proper period of time, for example, the high temperature holding period $\Delta T_1$ is 20 to 30 minutes.

As shown in FIG. 5 indicating the temperature cycle of hot-pressing compositing, further preferably, the hot-pressing compositing process further comprises a cooling step. After the high temperature holding time, a heating facility and/or the environment is cooled to the low temperature $T_{min}$ under the pressure condition, the low temperature is not higher than the room temperature (25 degrees Celsius), and is maintained under the constant pressure condition for a proper period of time, for example, the low temperature holding time $\Delta T_2$ is 20 to 30 minutes.

Through the hot-pressing compositing technical means in the embodiment, the anti-aging degree of the product is further improved, and the product service life is prolonged. Through the hot-pressing compositing cooling technology, stress releases in the adhesive cooling process under pressure, product deformation is avoided, and the product quality is further improved.

Figure 6:
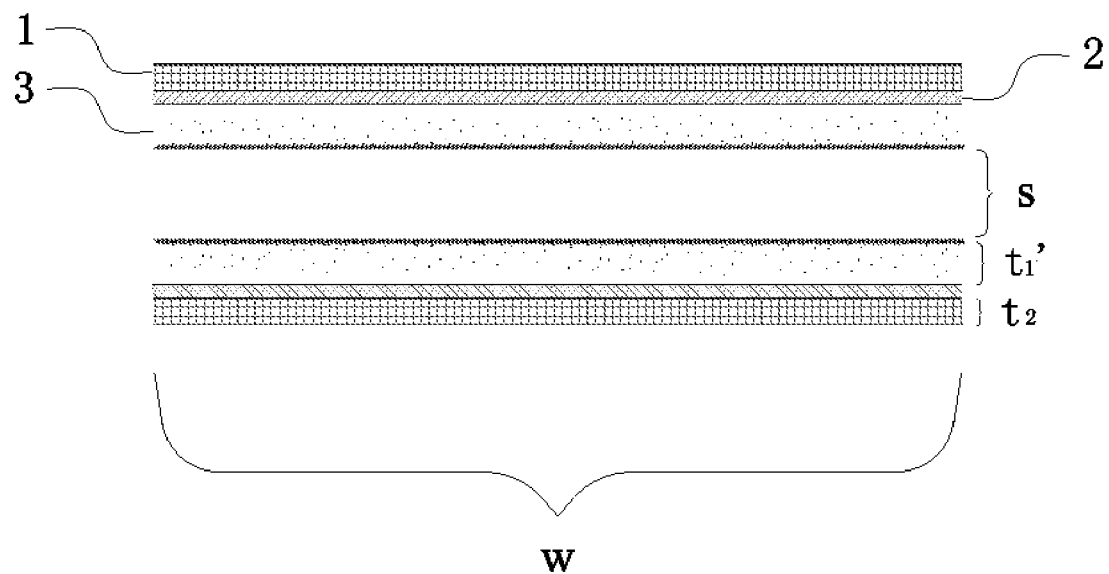
FIG. 6 is a schematic diagram of splitting according to a method of the present application.

Step 23: the natural stone board with the two surface planes being bonded with the base material layers is splitted, as shown in FIG. 6;

for example, a band saw with diamond cutter blades on the edge is used for transversely splitting the natural stone layer with the top surface and the bottom surfaces being bonded with the base material layers.

Preferably, the splitting saw kerf is less than 3 mm; and optimally, the splitting width is 1.2-2 m.

Wherein, the band saw can be a flexible metal band, and the two ends of the band saw are connected with rotation shafts correspondingly. In order to avoid the situation that lots of stones are damaged due to vibration of the band saw during work movement, the tension technology can be adopted, the two ends of the band saw are in drive connection with rotation shafts correspondingly, by applying force to the rotation shafts, the band saw is always in a tensioned state, that is, the tension of the band saw is maintained so that tension compensation of the band saw is achieved.

Through the tension compensation technique, the working efficiency of a conventional splitting machine can be changed, so that the splitting width w of the conventional splitting machine is changed from being less than 1.2 m to being greater than 1.2 m, and can be increased to 2 m. On the other hand, through tension compensation, the saw kerf width can be reduced, the stone processing loss is reduced, and the productivity of ultra-thin stones is increased. By adjusting the accuracy of tension compensation, the saw kerf width can be further reduced, and the thickness of the required natural stone board can be further reduced.

Step 24: calibrated planing with diamond roller (same as step 13) is carried out on the natural stone layer; and Step 25: surface treatment (same as step 14) is carried out on the natural stone layer.

It can be understood that the value of thickness variation in step 11 or 21 in the embodiment of the present application is related to the thickness of the natural stone layer of a finished product in step 14 or 25. The smaller the thickness of the natural stone layer of the finished product is, the lower the required value of thickness variation is, as shown in Table 1.

TABLE 1

| Examples of thickness variation | |
|---|---|
| Thickness (mm) of natural stone layer of finished product | Thickness variation (mm) of two sides of natural stone board |
| 0.5 | <± 0.05 |
| 2-3 | <± 0.2 |

Referring to FIGS. 3 to 7, further, for the stone size of each step in the above embodiments, the thickness to of the natural stone board 31 is 1.1-1.2 cm in steps 11-12.

The thickness t of the stone composite board output after surface treatment is 1-3 mm.

In a series of products of the present application, the thickness $t_1$ of the natural stone layer 3 of the stone composite board output after surface treatment is 0.5-2.5 mm.

In another series of products of the present application, the thickness $t_1$ of the natural stone layer 3 of the stone composite board after surface treatment is 0.1-1 mm.

For example, in step 21, the thickness $t_1'$ of the splitted natural stone layer of the natural stone board 31 with the thickness to being 1.1 cm is 4 mm, and the thickness $t_1''$ of the natural stone layer subjected to rigid calibrated roller planing in step 24 is 3 mm, and the thickness $t_1$ of the natural stone layer subjected to surface treatment in step 25 is 2.5 mm; and for another example, after multiple rigid calibrated roller planing in step 24, the thickness $t_1$ of the natural stone layer subjected to surface treatment can reach 0.8 mm or below.

Further, the thickness $t_1$ of the natural stone layer of the stone composite board subjected to surface treatment is less than or equal to 0.8 mm, or less than or equal to 0.6 mm, or less than or equal to 0.4 mm, or less than or equal to 0.2 mm, or is 0.2-0.4 mm, or 0.4-0.6 mm, or 0.6-0.8 mm.

The method may further comprise the following step of cutting the processed stone composite board into blocks.

The method may further comprise the following steps of cutting and shaping the stone composite board. Wherein, the base material layer is made of a flexible non-metallic material, such as a carbon fiber layer. The thickness of the natural stone layer is, for example, less than or equal to 0.2 mm, or is 0.2-0.4 mm.

The method may further comprise the following steps of punching the stone composite board into blocks. Wherein, the base material layer is made of a metallic material, and is an aluminum layer or a stainless steel layer. The thickness of the natural stone layer is, for example, 0.4-0.6 mm, or 0.6-0.8 mm.

Further, the embodiment of the present application further comprises a step of bending the stone composite board.

It should be noted that, when an outwards-curved structure and an inwards-curved structure of the stone composite board are processed, micro cracks may be generated in the natural stone layer, and the micro cracks may be minor damage, which is invisible to the naked eyes, in the natural stone layer, meanwhile, the surface of the natural stone layer can be subjected to curing treatment, and the surfaces of the natural stone layer can be coated with wax layers or unsaturated resin layers through curing treatment.

Figure 8:
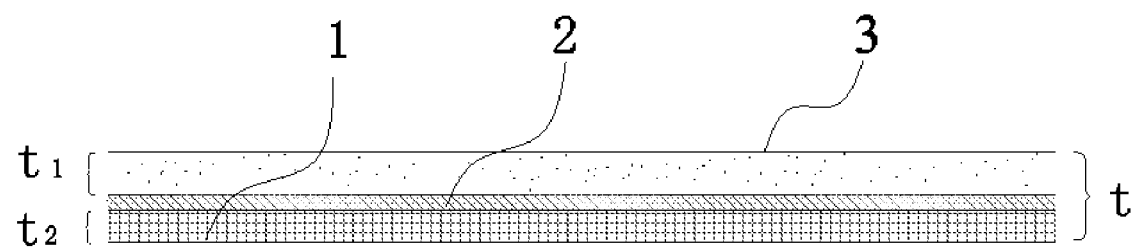
FIG. 8 is a schematic structural diagram of a stone composite board of the present application.

The present application further provides a stone composite board manufactured by the processing method in any one of the embodiments of the present application, referring to FIG. 8, the stone composite board comprises a base material layer 1, the surface of the base material layer is connected to a natural stone layer 3 through an adhesive layer 2, the natural stone layer is ground until the thickness $t_1$ is less than or equal to 0.8 mm, or less than 1 mm, or any value from 0.5 mm to 2.5 mm.

For example, in a product series of a stone composite board of the present application, the ground stone composite board with the thickness being less than or equal to 0.8 mm is adopted and bonded together with a base material layer through an adhesive layer, the thickness of the obtained stone composite board is reduced, and the proper base material layer is selected, so that the good bending performance is achieved. Specifically, when the thickness of the natural stone layer is less than or equal to 0.6 mm, the plasticity of the stone composite board is sufficient, and a curved board can be produced conveniently; when the thickness of the natural stone layer is less than or equal to 0.4 mm, the stone composite board can be conveniently cut into desired shape blocks, and can be manually cut; and when the thickness of the natural stone layer is less than or equal to 0.2 mm, the stone composite board is the best in flexibility, small in thickness and low in weight, the manual cutting effect of the stone composite board is optimal, and the need of free bending under the curvature condition can be met.

As another example, in another product series of the stone composite board of the present application, the thickness of the natural stone layer is less than 1 mm and the maximum width is 2 m, and the stone composite board can be used for laying on curved surfaces, or the thickness of the natural stone layer is greater than 1 mm, the maximum width is 2 m, the customization range of the natural stone layer is any thickness value $t_1$ in the range of 1-2.5 mm. The thickness variation range is $\pm t_1/10$. The base material layer can be selected from a rigid material or a flexible material arbitrarily.

In any one of the embodiments of the present application, the natural stone layer can be marble, limestone, quartzite, travertine or granite so that the good decorative effect can be achieved.

Further, the contour of the stone composite board described in any one of the embodiments of the present application is rectangular or arbitrarily polygonal or arbitrarily shaped. The stone composite board can be processed into any shape with closed contour curves according to the actual needs, such as regular polygonal blocks, irregular polygonal blocks and various irregularly shaped blocks.

In the stone composite board of the embodiment of the present application, the adhesive layer can be a resin adhesive layer or polymer adhesive layer, so that the requirement on adhesion between the natural stone layer and the base material layer is ensured.

For example, the adhesive layer can be PU adhesives used for bonding stones and other metallic materials, such as polyurethane adhesives, can be epoxy resin, namely AB adhesives, and can also be unsaturated resin used for surface repair; and as another example, the adhesive layer can be hot-melt adhesives.

Further, in the stone composite board in any one of the embodiments of the present application, the Mohs hardness of the adopted natural stone is less than or equal to 5.

In any one of the embodiments of the present application, the base material layer can be a flexible liner plate, such as a metal liner plate made of stainless steel, aluminum alloy or titanium alloy, or a non-metallic liner plate made of carbon fiber, glass fiber, polymer materials or quartz fiber. The base material layer can also be a rigid liner plate made of tiles, composite wood boards, polymer materials or glass. The flexible liner plate and the rigid liner plate can be distinguished by a preset elastic modulus value.

The thickness $t_2$ of the base material layer can be 0.1-1.1 mm depending on the materials.

For example, in any embodiment of the present application, the thickness $t_2$ of the carbon fiber layers is less than or equal to 0.2 mm, and the thickness $t_2$ of the aluminum material layers and the stainless steel layers is $0.5\pm0.05$ mm.

For another example, the thickness $t_2$ of the base material layer made of metal, alloy, plastic or resin materials is 1 mm$\pm$0.1 mm.

By adopting different base material layers and natural stone layers of different thicknesses, the stone composite board can have different flexibility properties, strength properties, hardness properties and elastic properties for meeting different needs.

Figure 9:
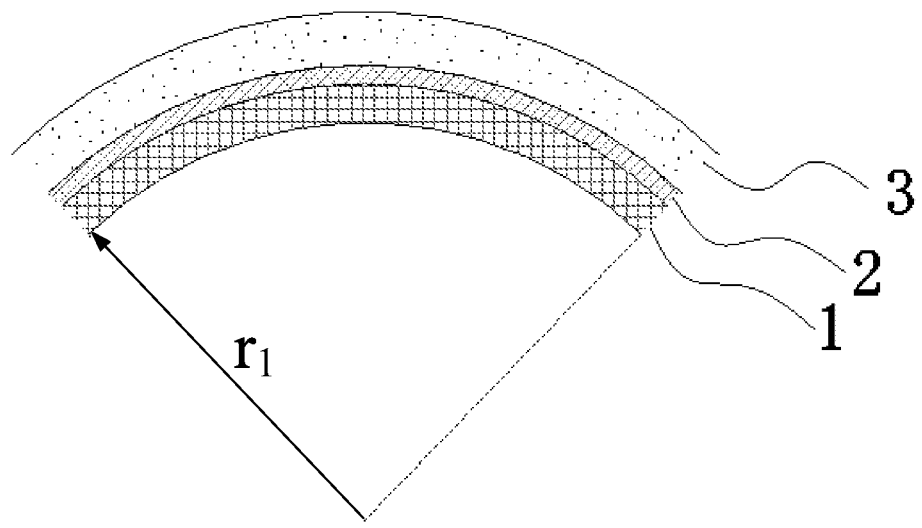
FIG. 9 is a schematic diagram showing the outwards bending state of a stone composite board.
Figure 10:
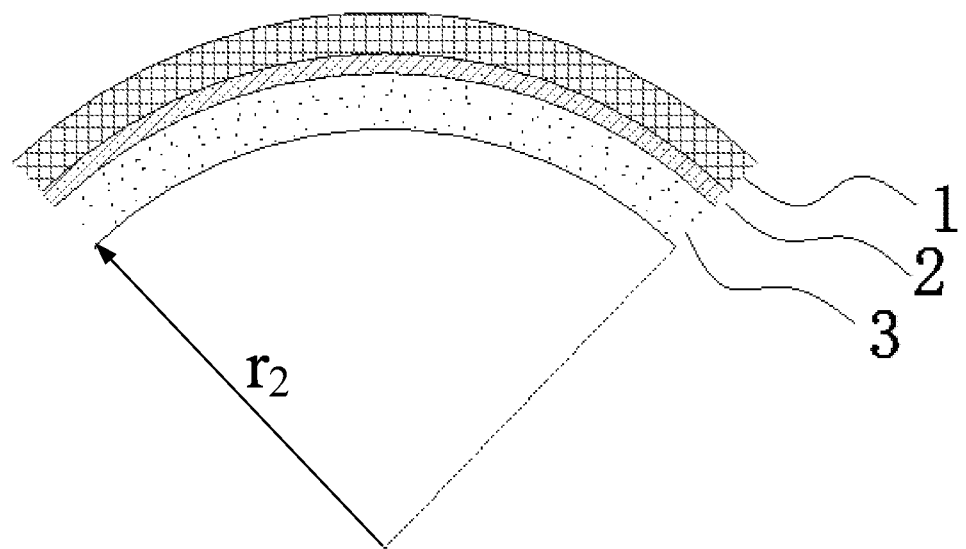
FIG. 10 is a schematic diagram showing the inwards bending state of a stone composite board.

Further, the stone composite board comprises at least one outwards-curved structure, as shown in FIG. 9, the circle center of the outwards-curved structure is located outside of the base material layer 1 side, and the outwards curve radius is $r_1$; or the stone composite board comprises at least one inwards-curved structure, as shown in FIG. 10, the circle center of the inwards-curved structure is located outside of the natural stone layer 3 side, and the inwards curve radius is $r_2$; or the stone composite board comprises at least one outwards-curved structure and at least one inwards-curved structure. In this way, the circular arc-shaped convex surface of a column can be wrapped and decorated through the outwards-curved structure, or the curved wall surface can be wrapped and decorated through the inwards-curved structure.

Further, according to the stone composite board of the embodiment, the number of the outwards-curved structures and the number of the inwards-curved structures can be one or two or more according to actual needs. When the stone composite board comprises both the inwards-curved structure and the outwards-curved structure, the inwards-curved structure and the outwards-curved structure may be distributed at intervals.

Further, the thickness $t_1$ of the natural stone layer of the stone composite board of the embodiment is less than or equal to 0.2 mm, the curvature radius $r_{1min}$ of the outwards-curved structure is no less than 5 cm, and the curvature radius $r_{2min}$ of the inwards-curved structure is no less than 50 cm. At this time, the manual cutting effect of the stone composite board is the best, and the need of arbitrary bending under this curvature condition can be met.

For example, according to the stone composite board and the processing method thereof in the embodiment, the thickness of the natural stone layer is 0.2-0.4 mm. At this time, the stone composite board is low in weight, meanwhile the good flexibility is maintained, and good strength and hardness property are achieved. Further, the curvature radius of the outwards-curved structure is no less than 50 cm; and the curvature radius of the inwards-curved structure is no less than 100 cm. Preferably, the natural stone layer is ground until the thickness is 0.3±0.03 mm, so that the thickness of the stone composite board is moderate.

The stone composite board of the embodiment may also be cut and shaped. For example, the stone composite board may be cut and shaped by tools such as scissors which meet the strength and hardness requirements, so that the stone composite board is cut into any desired shape according to the actual needs.

For another example, according to the stone composite board and the processing method thereof in the embodiment, the thickness of the natural stone layer is 0.4-0.6 mm. In this case, the stone composite board has good strength and hardness property, meanwhile certain flexibility is maintained. Further, the curvature radius of the outwards-curved structure is no less than 50 cm; and the curvature radius of the inwards-curved structure is no less than 400 cm. Preferably, the natural stone layer is ground until the thickness is 0.5±0.05 mm, so that the thickness of the stone composite board is moderate.

The stone composite board of the embodiment can be conveniently cut and shaped by a punching device, and the stone composite board can be conveniently punched into any desired shape according to the needs of the actual conditions.

According to the stone composite board and the processing method thereof in the embodiment, for example, the base material layer is an aluminum material layer or a stainless steel layer, and the thickness of the natural stone layer is 0.6-0.8 mm. At this time, the stone composite board has good strength property and hardness property. When the base material layer is an elastic stainless steel layer, the stone composite board can also have good elastic property. Preferably, the natural stone layer is ground until the thickness is 0.7±0.07 mm, so that the thickness of the stone composite board is moderate.

The stone composite board of the embodiment can be conveniently manufactured into any shape according to the needs of the actual conditions.

The stone composite board in any one of the embodiments of the present application can be adhered to a substrate such as wood, concrete, stone, brick, glass, ceramic tiles or gypsum boards, and can be used for home facility decoration, public facility decoration, wall and furniture finish, floor, ceilings, vehicle trims, instrumentation and other communication equipment, computer ornamental surfaces, housings or lamp components.

The above description is only embodiments of the present application and is not intended to limit the present application. For those skilled in the art, the present application may have various modifications and changes. Any modification, equivalent replacement and improvement made within the spirit and principle of the present application shall be included in the scope of claims of the present application.

The invention claimed is:

1. A processing method of a stone composite board, comprising:
   grinding and flattening two sides of a natural stone board until a preset standard value of thickness variation is reached;
   carrying out pressure-compositing on the ground flattened natural stone board and a base material layer through an adhesive layer;
   carrying out calibrated planing with diamond roller on the natural stone layer; and
   carrying out surface treatment on the natural stone layer.

2. The processing method of the stone composite board according to claim 1, further comprising:
   carrying out pressure-compositing on two surface planes of the ground flattened natural stone board and base material layers through adhesive layers; and
   splitting the natural stone board with the two surface planes being bonded with the base material layers.

3. The processing method according to claim 1, wherein the standard value of said thickness variation is ±δ, wherein δ is not greater than 1/10 of the thickness of the natural stone layer of a final product.

4. The processing method according to claim 1, wherein a pressure during said pressure-compositing is greater than 30 tons.

5. The processing method according to claim 1, wherein in the step of said planing with diamond roller, a surface of the natural stone layer is cut to a preset thickness by a roller with an emery surface, and a width of the roller is not less than a width of the stone layer.

6. The processing method according to claim 1, wherein in the step of said surface treatment,
   a surface of the natural stone layer is ground and polished through a grinding head, or
   the surface of the natural stone layer is subjected to matt finishing, or
   a leather surface of the natural stone layer is formed through a wire brush, or
   a lychee surface of the natural stone layer is formed by applying spotting force.

7. The processing method according to claim 1, wherein during said pressure-compositing, at least one surface plane of the natural stone board is covered with a solid hot-melt adhesive, then covered with a base material layer correspondingly, and afterwards the natural stone board and the base material layer are subjected to hot-pressing compositing for bonding together.

8. The processing method according to claim 1, wherein during said pressure-compositing, at least one surface plane of the natural stone board is coated with an adhesive, then covered with a base material layer correspondingly, and afterwards the natural stone board and the base material layer are subjected to cold-pressing compositing for bonding together.

9. The processing method according to claim 2, wherein a band saw with diamond cutter blades on an edge is adopted for transversely splitting the natural stone layer with a top surface and a bottom surface being bonded with the base material layer.

10. The processing method according to claim 7, wherein a temperature during said hot-pressing compositing is increased to be not lower than 260 degrees Celsius.

11. The processing method according to claim 7, wherein a high temperature during said hot-pressing compositing is maintained for 20 to 30 minutes under a pressure condition.

12. The processing method according to claim 7, wherein during said hot-pressing compositing, a temperature is decreased to room temperature while a pressure is maintained.

13. The processing method according to claim 9, wherein two ends of the band saw are connected with rotation shafts correspondingly; by applying force to the rotation shafts, tension of the band saw is maintained to achieve tension compensation.

14. The processing method according to claim 9, wherein a splitting saw kerf is less than 3 mm.

15. The processing method according to claim 9, wherein a splitting width is 1.2-2 m.

16. The processing method according to claim 12, wherein a low temperature is maintained for 20 to 30 minutes under the pressure condition.

17. The processing method according to claim 1, wherein a thickness of the stone composite board output after said surface treatment is 1-3 mm.

* * * * *